(12) United States Patent
Feron et al.

(10) Patent No.: US 11,033,855 B2
(45) Date of Patent: Jun. 15, 2021

(54) COMBINED ACIDIC GAS CAPTURE AND WATER EXTRACTION PROCESS

(71) Applicant: COMMONWEALTH SCIENTIFIC AND INDUSTRIAL RESEARCH ORGANISATION, Acton (AU)

(72) Inventors: Paul Hubert Maria Feron, Mayfield West (AU); Ramesh Thiruvenkatachari, Pullenvale (AU); Ashleigh Jane Cousins, Pullenvale (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 313 days.

(21) Appl. No.: 16/329,122

(22) PCT Filed: Sep. 1, 2017

(86) PCT No.: PCT/AU2017/050941
§ 371 (c)(1),
(2) Date: Feb. 27, 2019

(87) PCT Pub. No.: WO2018/039734
PCT Pub. Date: Mar. 8, 2018

(65) Prior Publication Data
US 2019/0224614 A1    Jul. 25, 2019

(30) Foreign Application Priority Data

Sep. 2, 2016    (AU) .............................. 2016903512

(51) Int. Cl.
*B01D 53/14*    (2006.01)
*B01D 61/00*    (2006.01)
(Continued)

(52) U.S. Cl.
CPC ..... *B01D 53/1425* (2013.01); *B01D 53/1468* (2013.01); *B01D 53/1475* (2013.01);
(Continued)

(58) Field of Classification Search
CPC ............ B01D 53/1425; B01D 53/1468; B01D 53/1475; B01D 61/002; B01D 61/364; B01D 2252/1035; B01D 2258/0283
(Continued)

(56) References Cited

U.S. PATENT DOCUMENTS

2011/0100218 A1    5/2011    Wolfe
2015/0232351 A1    8/2015    McGinnis
(Continued)

FOREIGN PATENT DOCUMENTS

CN    102665866 A    9/2012
CN    103429314 A    12/2013
(Continued)

OTHER PUBLICATIONS

Cousins, A. et al., "Model verification and evaluation of the rich-split process modification at an Australian-based post combustion CO2 capture pilot plant", Greenhouse Gases Science and Technology, 2: 329-345 (2012).
(Continued)

*Primary Examiner* — Anita Nassiri-Motlagh
(74) *Attorney, Agent, or Firm* — Merchant & Gould P.C.

(57) ABSTRACT

A process for the absorption of a target gaseous component from a gas stream comprising the steps of: contacting the gas stream with an absorber comprising an liquid absorbent for absorbing the target gaseous component to produce a rich liquid absorbent stream and a non target gaseous component, said non target gaseous component including water vapour; treating the rich liquid absorbent stream in a desorber to thereby release the target gaseous component and a water
(Continued)

vapour component into a desorber gas stream and produce a lean liquid absorbent stream; and forming a recovered water stream from the output of a water separator for separating the water vapour from the target gaseous component, said water separator forming part of the absorber and/or the desorber. The lean liquid absorbent stream exiting the desorber is treated with a forward osmosis (FO) membrane unit comprising a water permeable membrane, wherein the membrane unit transfers water from a salt water stream through the water permeable membrane to the lean liquid absorbent stream, thereby replenishing at least part of the water removed in the process.

20 Claims, 10 Drawing Sheets

(51) Int. Cl.
  *B01D 61/36* (2006.01)
  *C10G 70/00* (2006.01)
(52) U.S. Cl.
  CPC ......... *B01D 61/002* (2013.01); *B01D 61/364* (2013.01); *C10G 70/00* (2013.01); *B01D 2252/10* (2013.01); *B01D 2252/102* (2013.01); *B01D 2252/1035* (2013.01); *B01D 2252/2021* (2013.01); *B01D 2252/20405* (2013.01); *B01D 2252/20478* (2013.01); *B01D 2258/0283* (2013.01)
(58) Field of Classification Search
  USPC ........................................................ 423/220
  See application file for complete search history.

(56) References Cited

U.S. PATENT DOCUMENTS

| 2015/0343368 | A1 | 12/2015 | Koo et al. |
| 2016/0046360 | A1 | 2/2016 | Kim et al. |
| 2016/0167974 | A1* | 6/2016 | Novek .................. C07C 273/10 429/50 |

FOREIGN PATENT DOCUMENTS

| CN | 103691296 A | 4/2014 |
| CN | 104801155 A | 7/2015 |
| CN | 104837541 A | 8/2015 |
| CN | 105080323 A | 11/2015 |
| CN | 105392548 A | 3/2016 |

OTHER PUBLICATIONS

Extended European Search Report for European Patent Application No. 17844696.9, dated Feb. 17, 2020, 11 pages.
Feron, P. et al., "Water production through $CO_2$ capture in coal-fired power plants", Energy Science & Engineering, 5 (5): 244-256 (Oct. 2017).
Guo, D. et al., "Amino Acids as Carbon Capture Solvents: Chemical Kinetics and Mechanism of the Glycine & Co2 Reaction", Energy & Fuels, 27(7): 3898-3904 (Jun. 2013).
McGinnis, R. et al., "Energy requirements of ammonia-carbon dioxide forward osmosis desalination", Desalination, 207( 1-3): 370-382 (Mar. 2007).
International Search Report and Written Opinion of the International Searching Authority for International Patent Application No. PCT/AU2017/050941 dated Nov. 10, 2017, 9 pages.
Chinese Office Action for Chinese Patent Application No. 201780065501.X dated Feb. 2, 2021, 14 pages.

* cited by examiner

COMBINED ACIDIC GAS CAPTURE AND WATER EXTRACTION PROCESS

PRIORITY CROSS-REFERENCE

This application is a National Stage Patent Application of PCT/AU2017/050941 filed 1 Sep. 2017, which claims priority from Australian Provisional Patent Application No. 2016903512 filed 2 Sep. 2016 and which applications are incorporated herein by reference. To the extent appropriate, a claim of priority is made to each of the above disclosed applications.

TECHNICAL FIELD

The present invention relates to a method and apparatus for an energy efficiency means to strip acidic gases from liquid absorbents and generate a water stream.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

In existing and future fossil fuel—fired power plants, $CO_2$ capture technologies would offer a mechanism for reducing $CO_2$ emission levels. In fact, if coal is to remain an important fuel for power production under any future climate/energy legislation, carbon capture and sequestration (CCS) will be essential.

However, carbon capture comes at an additional cost in terms of both money and resources needed to manufacture, install, and operate the advanced technologies. The components of any capture plant require a portion of the electricity generated by the power plant in order to operate, in addition to large quantities of freshwater for cooling and other purposes. The use of currently available carbon capture techniques adds additional demands for electricity and water on top of the baseline resource load. The additional water required for a power plant with $CO_2$ capture technology is largely due to the additional cooling water requirements used during capture and compression.

The separation of $CO_2$ from flue gases in power stations, cement kilns and in steel manufacturing allows these industrial activities to proceed with the use of fossil fuels, while reducing the emissions from the most important greenhouse gas, i.e. $CO_2$. Although several different processes are currently under development for the separation of $CO_2$ from flue gases, chemical absorption processes using aqueous solutions of chemical absorbents are the leading technology, mainly because of its advanced state of development. While it is already available at low $CO_2$ removal capacities, it is not at the scale necessary for large scale industrial operation. Scaling up the process is therefore a major challenge.

The geographic location of many of these $CO_2$ recovery sites are arid and have limited access to water suitable for human consumption or agricultural purposes. Thus, there exists a need to provide a process and apparatus that is more energy efficient in generating water and recovering $CO_2$ than the present processes. Various approaches have been suggested in the prior art.

US2015/0343368 proposes the use of an absorption solution containing $CO_2$ to function as a draw solution in a forward osmosis unit immediately after the absorber unit to enable fresh water to migrate into the draw solution. A fresh water stream is then formed through the condensation of the $CO_2$/steam/absorbent mixture to form a water stream which may be further purified to remove the condensed absorbent. Whilst this process generates fresh water there are still further improvement to be made to producing a more energy efficient and robust process to simultaneously remove acidic gases from a gas stream while producing a fresh water stream.

SUMMARY OF THE INVENTION

In a first aspect of the present invention, there is provided a process for the absorption of a target gaseous component from a gas stream comprising the steps of:

contacting the gas stream with an absorber comprising a liquid absorbent for absorbing the target gaseous component to produce a rich liquid absorbent stream and a non target gaseous component, said non target gaseous component including water vapour;

treating the rich liquid absorbent stream in a desorber to thereby release the target gaseous component and a water vapour component into a desorber gas stream and produce a lean liquid absorbent stream; and forming a recovered water stream from the output of a water separator for separating the water vapour from the target gaseous component, said water separator forming part of the absorber and/or the desorber, wherein the lean liquid absorbent stream exiting the desorber is treated with a forward osmosis (FO) membrane unit comprising a water permeable membrane, wherein the membrane unit transfers water from a salt water stream through the water permeable membrane to the lean liquid absorbent stream, thereby replenishing at least part of the water removed in the process.

The liquid absorbent stream may comprise any liquid that has a higher osmotic pressure than the salt water stream, such as glycol, ionic liquids or imidazoles. In a preferred embodiment, the liquid absorbent stream is an aqueous absorbent stream.

The water removed in the process includes the water removed in the recovered water stream in additional to other losses of water through water vapour losses in the target and non-target gaseous exit streams. Preferably, the replenished water is equal to at least the water removed in the recovered water stream and more preferably is equal to the total water removed in the process.

The invention is preferably suited to target gases selected from the group consisting of acid gases, including but not limited to $CO_2$, $H_2S$, or $SO_2$. The source of target gases may be from natural gas streams, flue gases, biogas, shale gas, coal seam gas, industrial gases, air, etc.

The FO membrane unit comprises a salt water inlet and a salt water outlet stream. The salt water inlet stream is preferably lower in temperature than the lean liquid absorbent stream entering the FO unit. Within this configuration, the FO membrane unit functions as both a means to replenish the water of the process from a salt water source and a means to cool down the lean absorbent stream prior to re-entering the absorber. Thus, the process configuration of the present invention provides an energy efficient means of recycling the lean liquid absorbent stream while generating a recovered water stream to be preferably used for alternative purposes other than process water.

The recovered water stream may be derived from the absorber and/or the desorber. Consequently, the water separator may form part of the absorber and/or the desorber. The water separator may be any device which is able to separate water vapour from the gaseous steam in the absorber and/or desorber and form a liquid water stream. The water separator is preferably a condenser.

Preferably, the water outlet stream comprises water that was been separated from a condenser in the desorber.

In some embodiments, the recovered water is separated from the absorber by passing a portion of an absorber gas stream through a water separator (e.g. a flash vessel) to separate the water vapour component from the absorbent and flue gases to form at least part of the recovered water stream. The water separator of the absorber preferably includes a water vapour permeable membrane, which provides a compact means of removing the water vapour from within the absorber. The water vapour permeable membrane preferably forms part of an evaporator, although in some embodiments a water vapour permeable membrane may also form part of a condenser. The advantage of this configuration is that the returned lean liquid absorbent has been cooled thereby increasing its capacity to absorb the acidic gas.

In a preferred embodiment, the recovered water stream requires no (or no significant) processing for its intended purposes. For example, the water stream may be used for agricultural purposes where the water stream may flow into a settling pond or tank where it may cool down to ambient temperature prior to use. Operations, such as filtering or pH adjustment of the recovered water stream may be applied.

Preferably, the water exiting the water separator (i.e. prior to any post treatment operations) has a total dissolved solids content of less than 10000 ppm, more preferably less than 5000 ppm, even more preferably less than 2000 ppm less, yet even more preferably than 1000 ppm, yet even more preferably less than 500 ppm and most preferably less than 50 ppm. The TDS in the recovered water from the absorber is likely to be higher than the recovered water from the stripper due to there being more free or unreacted absorbent in the absorber relative to the stripper. Depending upon the absorbent used, the TDS of the recovered water from the absorber may require additional processing to lower the TDS content (e.g. reverse osmosis, nano-filtration, ion exchange or activated carbon filtration.)

The pH of the water stream exiting the water separator is preferably between 5 and 9 and more preferably between 6 and 8.

In alternative embodiments where the recovered water stream is for potable purposes, additional purification steps may be required.

It has been found that the quality of the recovered water stream may be significantly improved by the selection of the liquid absorbent.

In an further embodiment of the present invention, the FO membrane unit may be combined with a direct contact membrane distillation (DCMD) unit to provide a two stage cooler for the lean liquid absorbent stream, with the DCMD not only decreasing the temperature of the lean aqueous absorption stream, but increasing the net osmotic pressure in the FO membrane through increasing the differential solute concentration between the feed salt water stream and the lean aqueous absorption stream. Within this embodiment, the lean liquid absorbent stream passes through a DCMD unit, said DCMD unit comprising a membrane (preferably a heat tolerant hydrophobic membrane) having a feed membrane interface and a permeate membrane interface, prior to passing through the forward osmosis unit, the DCMD unit resulting in a portion of the water in the lean liquid absorbent stream to vaporise on the feed membrane interface and condense on the permeate membrane interface, thereby cooling the lean liquid absorbent stream and transferring water to the feed/inlet salt water stream.

Liquid Absorbents

The liquid absorbent is preferably an aqueous absorbent. However, non-aqueous absorbents such as glycols and ionic liquids may be also be used. In these embodiments, the lean absorbent stream is preferably substantially non-aqueous prior to entering the FO unit.

The liquid absorbent for absorbing the target gas is preferably selected from the group consisting of: ammonia, alkanol-amines, alkyl-amines, amino-acids, salts thereof, inorganic bases and mixtures thereof.

The liquid absorbent preferably has a vapour pressure at 100° C. of less than 200 mm Hg, more preferably less than 100 mmHg and even more preferably 40 mm Hg. The lower the vapour pressure at 100° C. of the liquid absorbent, the lower the amount of absorbent will be present in the water stream, particularly when a condenser is used as the water separator.

Preferred non-volatile absorbents include amino acids salt solutions. The amino acid salts may be derived from the group consisting of Histidine, Alanine, Sarcosine, Isoleucine, Arginine, Leucine, Asparagine, Lysine, Aspartic acid, Methionine, Cysteine, Phenylalanine, Glutamic acid, Threonine, Glutamine, Tryptophan, Glycine, Valine, Ornithine, Proline, Selenocysteine, Serine, Taurine and Tyrosine.

The counter-ion is preferably selected from the group consisting of sodium, potassium, calcium, magnesium, lithium and/or barium ions.

Examples of liquid absorbents include mono-ethanolamine, glycine and sodium glycinate.

The use of amino-acid salt solutions for acidic gas capture provide the following distinguishing features:

Fast reaction kinetics

High achievable cyclic loadings

Good stability towards oxygen

Favourable binding energy

Their specific properties make amino-acid salts suitable for application in membrane gas absorption units, allowing compact equipment design and potentially leading to reductions in investment costs. Importantly, draw solutions containing amino acids have a relative low solute loss of the draw solute to the feed side.

Salt Water

The salt water preferably any suitable aqueous solution which possess a sufficiently low salt concentration to enable the lean liquid absorbent to effectively function as a draw solution. The salt water is preferably selected from the group consisting of sea water, brackish water, formation water or industrial waste water.

The greater the osmotic pressure difference over the FO membrane the lower the FO membrane surface area is required to transfer the target amount of water across the FO membrane.

The osmotic pressure difference created by the concentration gradient between the cooling water and the lean liquid absorbent stream is the driving force (instead of hydraulic pressure) for the water transportation across the FO membrane. The selection of the liquid absorbent is made not only to maximise the acidic gas capture but also to maximise water permeation through the FO membrane. Hence the liquid absorbent must also possess characteristics such as high osmotic pressure, cost effective, non-toxic, chemically stable and compatible with the membrane.

Osmotic pressure of an ideal dilute solution can be given by the theory proposed by Van't Hoff;

$$\pi = n(c/MW)RT \qquad (1)$$

Where, n is the number of moles of species formed by the dissociation of solutes in the solution, c is the solute concentration in g/L, MW is the molecular weight of the solute, R is the gas constant and T is the absolute temperature of the solution. Lower the molecular weight of the draw solute the larger the osmotic pressure.

The salt water inlet stream is preferably cooler than lean liquid absorbent stream entering the FO membrane unit. More preferably the temperature of the salt water is at least 10° C. lower than the temperature of the lean liquid absorbent stream entering the FO membrane unit, more preferably at least 20° C., even more preferably 40° C. and yet even more preferably at least 60° C. lower than the temperature of the lean liquid absorbent stream entering the FO membrane unit. The greater the temperature difference between the two streams the greater the heat transfer between the two streams and hence the lower the membrane surface required for the target temperature of the lean liquid absorbent stream to be reached.

Preferably the FO membrane unit design and process operating conditions take into account the heat and mass transfer requirements, such that the unit operation delivers the required cooling and water transfer requirements to the lean liquid absorbent stream.

The optimal amount of water transferred through the FO membrane, from an energy efficiency perspective, may be determined by assessing the graph of the specific reboiler duty versus the ratio of the mass of water transferred through the FO membrane by the mass of $CO_2$ removed by the process. FIG. 7 highlights an example in which 0.41 kg of water passes through the FO membrane per kg of $CO_2$ captured prior to specific reboiler duty increasing.

Auxiliary cooling and water replenishment unit operations may be provided if the FO membrane unit performance alone does not match process requirements.

Forward Osmosis Unit

Forward osmosis, also known as direct osmosis, allows water to naturally traverse the semi permeable membrane from a lower solute concentration solution to a higher solute concentration solution, known as the draw solution.

The membrane is preferably a water permeable membrane and more preferably a water selective membrane. The membrane is preferably impermeable to the solute. Leakage of solute/absorbent from the lean liquid absorbent stream (draw solution) to the salt water stream results in a net loss of absorbent from the process and thus additional absorbent is required to compensate for this loss to enable to the performance of the process to be maintained.

Suitable membrane materials for aqueous absorption liquids are hydrophilic polymers, such as, polysulphone, polyethersulphone, polyvinylalcohol, polybenzimidazole and polyamides and ceramic materials membrane materials which are generally used for liquid filtration purposes such micro-filtration, ultrafiltration, nano-filtration and reverse osmosis.

The salt water inlet stream preferably contacts the FO membrane adjacent the outlet lean liquid absorbent stream to form a counter current or concurrent configuration. A counter current configuration is preferred as this configuration provides excellent mass and heat transfer performance thereby enhancing the cooling of the lean liquid absorbent stream and the transfer of water from the salt water stream to the lean liquid absorbent stream across the water permeable membrane.

To further enhance heat and mass transfer, the FO unit is preferably configured as a shell and tube or plate and frame heat exchanger). The salt water stream preferably flows through the shell component and the lean liquid absorbent stream flows through the tube component of the FO unit. This arrangement enables the mass and heat transfer performance to be more readily controlled through controlling the flowrate of the salt water stream.

Additional improvements in the heat transfer efficiency of the membrane may be achieved through selecting thinner and/or more conductive membrane materials than what are conventionally used.

The membrane thicknesses may be in the range of 0.01 mm to 1 mm and preferably about 0.1 mm. The membranes may comprise selective layers (of about for example 1 μm) with porous structures supporting this thin layer. The pores may be filled with a liquid which is preferably more thermally conductive than membrane composition (e.g. polymers).

Preferably, the heat transfer coefficient of the FO membrane will be at least 500 $W/m^2K$, more preferably at least 1000 $W/m^2K$, even more preferably at least 1500 $W/m^2K$, yet even more preferably at least 2000 $W/m^2K$ and most preferably at least 2500 $W/m^2K$.

The actual heat transfer coefficient achieved will be dependent upon a number of factors, including the composition and thickness of the membrane material; the difference between the bulk solution temperature and at actual temperature at the membrane surface; the configuration of FO membrane and membrane module construction; and the hydrodynamic conditions of feed and draw solutions including flow orientation.

In a second aspect of the present invention, there is provided an apparatus for the recovery of acidic gases from a gaseous stream comprising:

an absorber for contacting an liquid absorbent with a gas stream, said absorbent capturing a target gaseous component to produce a rich liquid absorbent stream, and a non target gaseous component, said non target gaseous component including water vapour;

a desorber to heat treat the rich liquid absorbent stream to thereby release the target gaseous component from the rich liquid absorbent stream to produce a lean liquid absorbent stream and water vapour;

a water separator for separating water vapour from a target gaseous component to form a recovered water stream, said water separator forming part of the absorber and/or the desorber;

a forward osmosis membrane unit positioned to receive the lean liquid absorbent stream; and an absorber inlet stream from receiving the lean liquid absorbent stream from the forward osmosis membrane unit wherein the forward osmosis membrane unit comprises an inlet salt water stream and an outlet salt water stream, said forward osmosis membrane unit comprising a water permeable membrane to enable water to migrate form the salt water stream to the lean liquid absorbent stream.

In the context of the invention, the usually practiced term of "rich" liquid absorbent (i.e. gas-rich) refers to the liquid absorbent which contains an amount of absorbed gases higher than the minimum concentration. These gases are progressively removed during the regeneration process. At the point at which no more gases are being desorbed from the liquid absorbent, i.e. the minimum concentration of absorbed gases, the liquid absorbent is called "lean" (i.e. gas-lean). At this point the liquid absorbent might still contain a sizeable amount of absorbed gases. Thus in the present application a liquid absorbent containing an amount of absorbed gases higher than the lean absorbent concentration is referred to as a rich liquid absorbent.

In the context of the invention, the term "replenish" refers to the restoring of the lean liquid absorbent stream to its steady state absorbent/salt concentration entering the absorber. This is achieved through the net water loss of the closed process being nil through the replenished water entering the process equal to the loss of water from the process, including the recovered water stream. It will be understood that a buffer tank or the like may be employed to balance any short term fluctuations in water content within the system.

Total Dissolved Solids (TDS) refers to any minerals, salts, metals, cations or anions dissolved in water. Total dissolved solids (TDS) comprise inorganic salts (principally calcium, magnesium, potassium, sodium, bicarbonates, chlorides and sulfates) and some small amounts of organic matter that are dissolved in water

BRIEF DESCRIPTION OF THE DRAWINGS

The present invention will now be described with reference to the figures of the accompanying drawings, which illustrate particular preferred embodiments of the present invention, wherein.

DETAILED DESCRIPTION OF THE INVENTION

Figure 1:
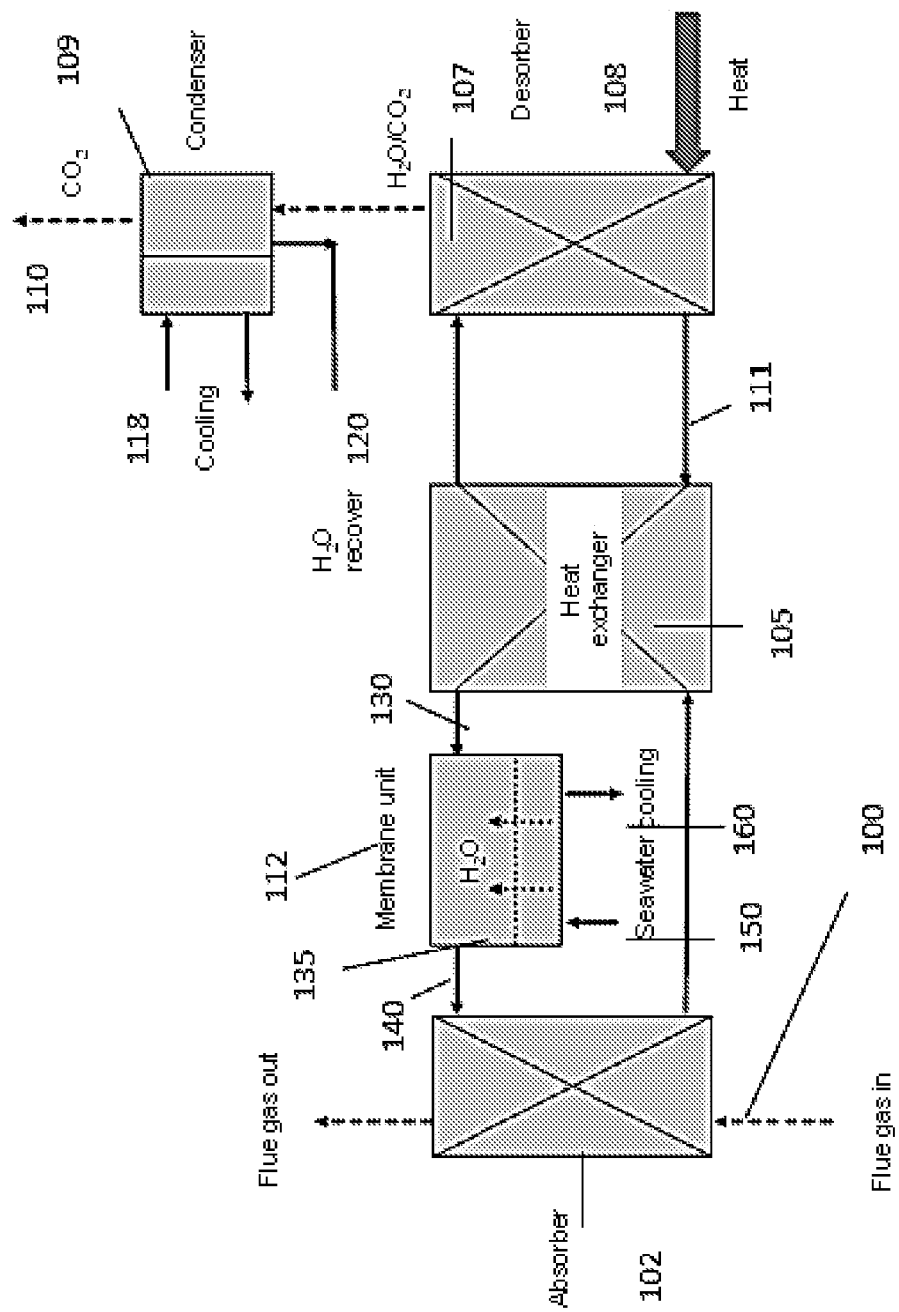
FIG. 1 is a schematic diagram of a process under the scope of the present invention for the extraction of an acidic gas from a flue gas stream featuring a recovered water stream derived from the desorber.

The present invention is applicable to the regeneration of liquid absorbents, which are preferably aqueous, containing gases which have been absorbed from a mixture of feed gases at a lower temperature than the regeneration temperature, at which these gases are removed from the liquid absorbent. Gases to be removed are typically so-called acid gases like carbon dioxide and hydrogen sulphide, but the process is applicable to any gas-liquid absorbent combination, where the gas absorption is thermally reversible. The liquid absorbent will typically contain a component easily vaporised, such as water or methanol and one or more components which lead to an increase in the gas absorption capacity of the liquid absorbent. These types of components are dependent on the gases to be removed. For acid gas removal these components are typically organic bases such amines including ammonia, mono-ethanolamine and other alkanolamines and inorganic bases such as carbonate and phosphate.

After cooling, the flue gas 100 is brought into contact with the chemical absorbent in an absorber 102. A blower (not shown) is required to pump the gas through the absorber after preferably passing through a cooler (not shown) at temperatures typically between 40 and 60° C. whereby $CO_2$ is then bound by the chemical absorbent in the absorber 102.

After passing through the absorber 102, the flue gas undergoes a water wash section (not shown) to balance water in the system and to remove any droplets of vapour carried over and then leaves the absorber 102.

The "rich" absorbent solution, which contains the chemically bound $CO_2$, is then pumped to the top of a stripper or desorber 107, via a heat exchanger 105. The regeneration of the chemical absorbent is carried out in the stripper 107, typically at elevated temperatures (100-140° C.) and pressures between 1 and 2 bar. The stripper 107 is a gas/liquid contactor in which the rich absorbent is contacted with steam produced in a reboiler 108.

Heat is supplied to the reboiler 108 to maintain the regeneration conditions. This leads to an energy penalty as a result of the heating up the solution to provide the required desorption heat for desorbing the chemically bound $CO_2$ and for steam production which acts as a stripping gas. Steam is recovered in a condenser 109 through liquid stream 120 with the $CO_2$ product gas 110 leaving the condenser 109. The heat of condensation is carried away in cooling water or an air cooling device 118. $CO_2$ removal is typically around 90%. The $CO_2$ product 110 is a relatively pure (>99%) product.

The water vapour is separated from the $CO_2$ in the condenser 109 which cools the steam/$CO_2$ vapour mixture resulting in the condensation of the steam to form the water recovery/outlet stream 120. Depending upon the volatility of the chemical absorbent and the end use of the recovered water stream, additional purification steps may be required.

Due to the selective nature of the chemical absorption process, the concentration of inert gases is low. The "lean" absorbent solution 111, containing far less $CO_2$ is then pumped back to the absorber 102 via the lean-rich heat exchanger 105 and a forward osmosis unit 112 to bring it down to the absorber temperature level and replenish the water content of the "lean" absorbent solution 11.

A range of draw solution considered to maximise $CO_2$ capture and for extracting water from the cooling fluid includes amino-acid salt solutions and other amines, such as MEA.

The forward osmosis (FO) unit comprises a lean absorbent inlet stream 130 which flows into the FO unit 112 where the stream is contacted with a water permeable membrane 135, which separates the lean absorbent stream from a cooling water stream 150, 160.

The salt concentration in the lean absorbent solution is greater than that of the cooling water stream and thus acts as a draw solution, drawing water across the water permeable membrane into the lean absorbent stream, thereby diluting the salt concentration of the lean absorbent stream and cooling the lean absorbent stream through the transfer of a cooler water component across the water permeable membrane in addition to the conductive heat transfer through the water permeable membrane. The lean absorbent solution 140 exiting the FO unit is thereby cooler and more dilute than the incoming stream 130. A buffer tank (not shown) may exist between the exiting lean absorbent solution 140 and the absorber 102 to assist in the regulation of the lean absorbent flowrate and concentration to ensure that the absorber is able to operate under steady state conditions. The recovered water recovery stream may have the capacity to be at least partially diverted into the buffer tank to replenish the lean absorbent solution at times when the FO unit under maintenance.

The forward osmosis unit 112 is preferably configured in a counter current configuration. This configuration assists in maximising the heat and mass transfer efficiency of the FO unit. The operation of the FO unit is preferably controlled such that the water transferred from the FO unit into the lean absorbent stream results in a net zero loss of water from the process as a whole. In one embodiment, the water flowrate transferred from the cooler water stream to the lean absorbent stream is approximately equal to the flowrate of the water recovery stream 120.

Introduction of forward osmosis unit before the absorption column has significant benefits compared to having it after the absorption column. The forward osmosis unit before the absorption column eliminates the need for an additional trim cooler to cool the absorption liquid. At this point the absorption liquid to the FO unit is at a more stable temperature. More stable temperature to the FO membrane unit with cooling water on one side of the membrane and the absorbent liquid on the other, the unit is able to act as a heat exchanger and also able to concentrate the cooling solution. The cooling water feed solution can be seawater, brackish water or any wastewater. In contrast, introduction of forward osmosis unit after the absorber comes in contact with the $CO_2$ rich absorbent liquid stream and will suffer from unstable pH and temperature of solutions. Dissolved gases are not rejected well by FO membranes. There will also be loss of $CO_2$ present in the aqueous phase from the absorbent liquid.

The energy requirement of a chemical absorption process mainly stems from the heat supplied to the reboiler 108. This heat is used to produce steam from the lean solution 106 which acts a stripping gas, i.e. it keeps the partial pressure of $CO_2$ sufficiently low to provide a driving force for the desorption process. The steam is also the carrier of thermal energy which, through its condensation, releases the energy required to desorb $CO_2$ and to heat up the chemical absorbent through the desorption column 107. The amount of steam generated in the reboiler 108 should be kept as a low as possible, but some of the steam will always inevitably be lost from the desorption unit with the $CO_2$ produced and this represents an energy loss, as the steam is usually condensed and the energy is carried away in the cooling water.

Figure 2:
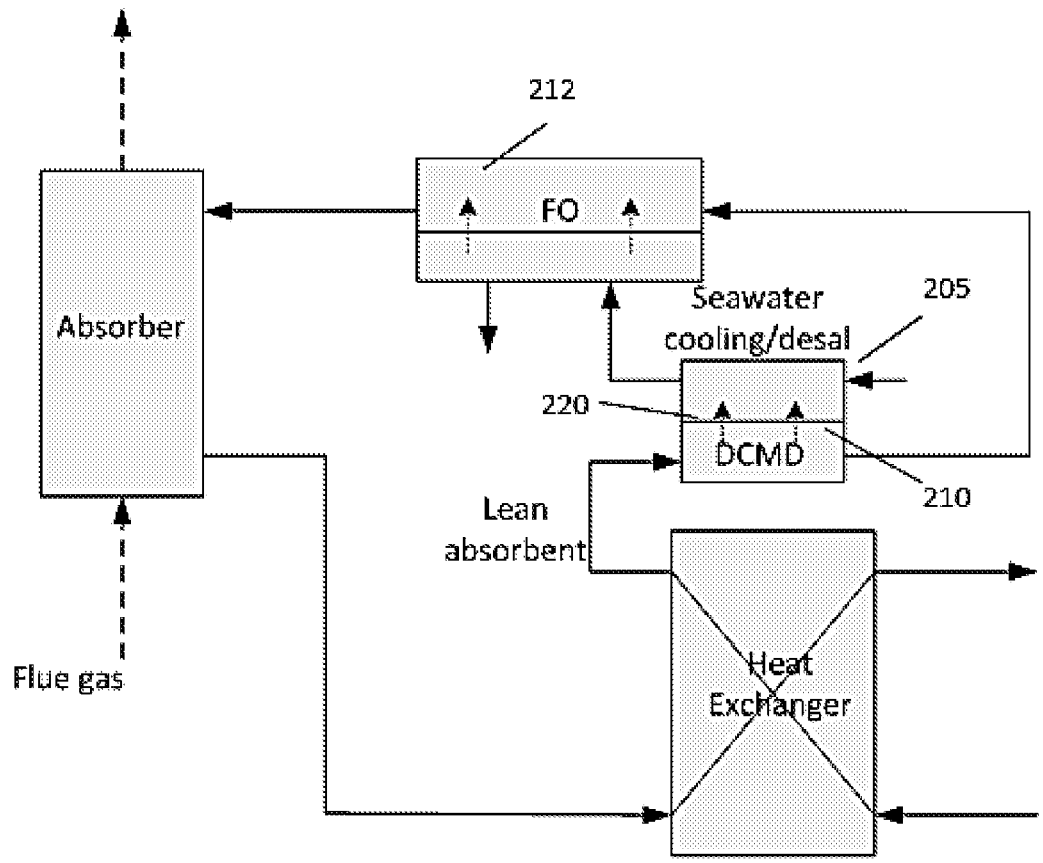
FIG. 2 is a schematic diagram of process variation of FIG. 1, featuring a direct contact membrane distillation unit and forward osmosis unit in series.

In a variation of the FIG. 1 process configuration, FIG. 2 illustrates the integration of a direct contact membrane distillation (DSMD) unit after the heat exchanger 205. Within this embodiment, vaporization of the lean absorbent takes place at the feed membrane interface 210 and condensation at the permeate membrane interface 220, membrane distillation requires the heat of vaporization to be supplied to the feed vapour-liquid interface (utilises heat from stripper in lean absorbent stream), and the heat of condensation to be removed from the vapour-liquid interface in the permeate side. Conductive heat transport through the thin membrane also takes place. The DCMD unit and FO unit 212 thereby operate as a two stage cooler operation, with the DCMD unit assisting in regulating the temperature of the lean absorbent stream entering the FO.

Figure 3:
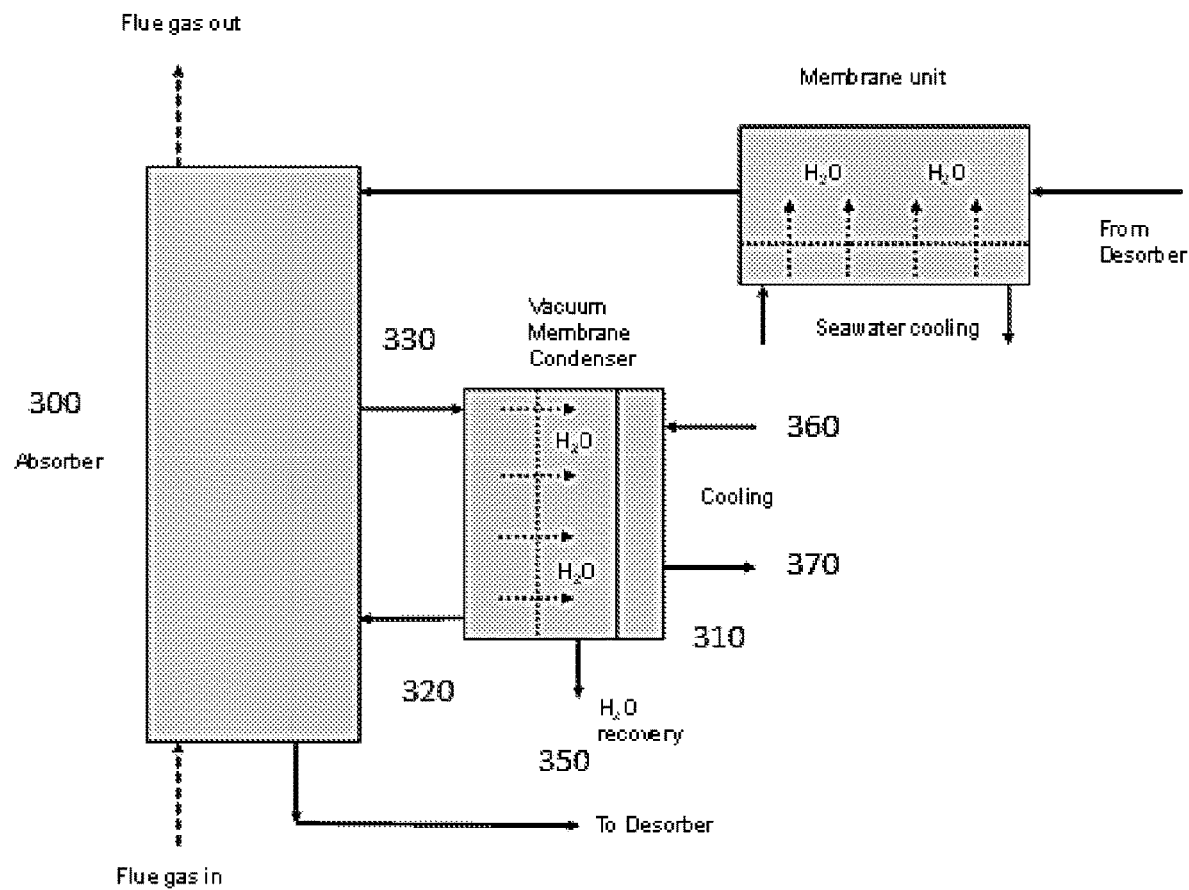
FIG. 3 is a schematic diagram of process variation of FIG. 1 or 2, featuring a water recovery stream derived from the absorber.

A further means in which the water can be recovered from the $CO_2$ absorption liquid with no net additional energy input is through utilisation of the heat released in the absorber 300. The reaction between $CO_2$ and the absorption liquid is exothermic with temperatures increasing to levels above 60° C. in the absorber 300. The increase in temperature reduces the driving force for $CO_2$ absorption and intercooling may be used to maintain the temperatures in the absorber. As illustrated in FIG. 3, the process involves collecting the absorption liquid from the absorber 300 and feeding it to a cooler 310 and then returning the cooled absorption liquid 320 to the absorber 310. The cooling can very effectively be performed by evaporative means, i.e. the extracted absorption liquid 330 can be brought into a cooling vessel 310 with a pressure level below the equilibrium water vapour pressure. Water will evaporate from the absorption liquid and condense on a surface inside the vessel 340 which is separately kept at a temperature which is lower than temperature of the absorption liquid. The water thus collected is removed via a conduit from the vessel 350.

The cooled down absorption liquid is removed via a separate conduit and returned to the absorber 320. The vessel 310 may be a flash evaporator vessel or a vacuum membrane evaporator may be utilised, in which water evaporates through the membrane and condenses on the other side on a cooled surface, which may be cooled with cooling water 360, 370, such as seawater. The use of a vacuum membrane evaporator provides the benefits of a compact design for the water recovery equipment.

EXAMPLES

The $CO_2$ capture/water recovery process performance was analysed using Protreat™ software. The feed gas conditions in table 1 are representative of a flue gas in coal fired power plant with the flow rate typical of a post-combustion $CO_2$ capture pilot plant[1].

[1] Model verification and evaluation of the rich-split process modification at an Australian-based post combustion $CO_2$ capture pilot plant, Ashleigh Cousins, Aaron Cottrell, Anthony Lawson, Sanger Huang, Paul H. M. Feron, Greenhouse Gas Sci Technol. 2:329-345 (2012)

TABLE 1

| Feed gas conditions for process modelling | |
|---|---|
| Temperature | 40° C. |
| Pressure | 108 kPa |
| Component concentration | |
| $H_2O$ | 6.9% |
| $CO_2$ | 12.1% |
| $N_2$ | 74.9% |
| $O_2$ | 6.1% |
| Flow rate | 600 kg/h |

Example 1

Figure 4:
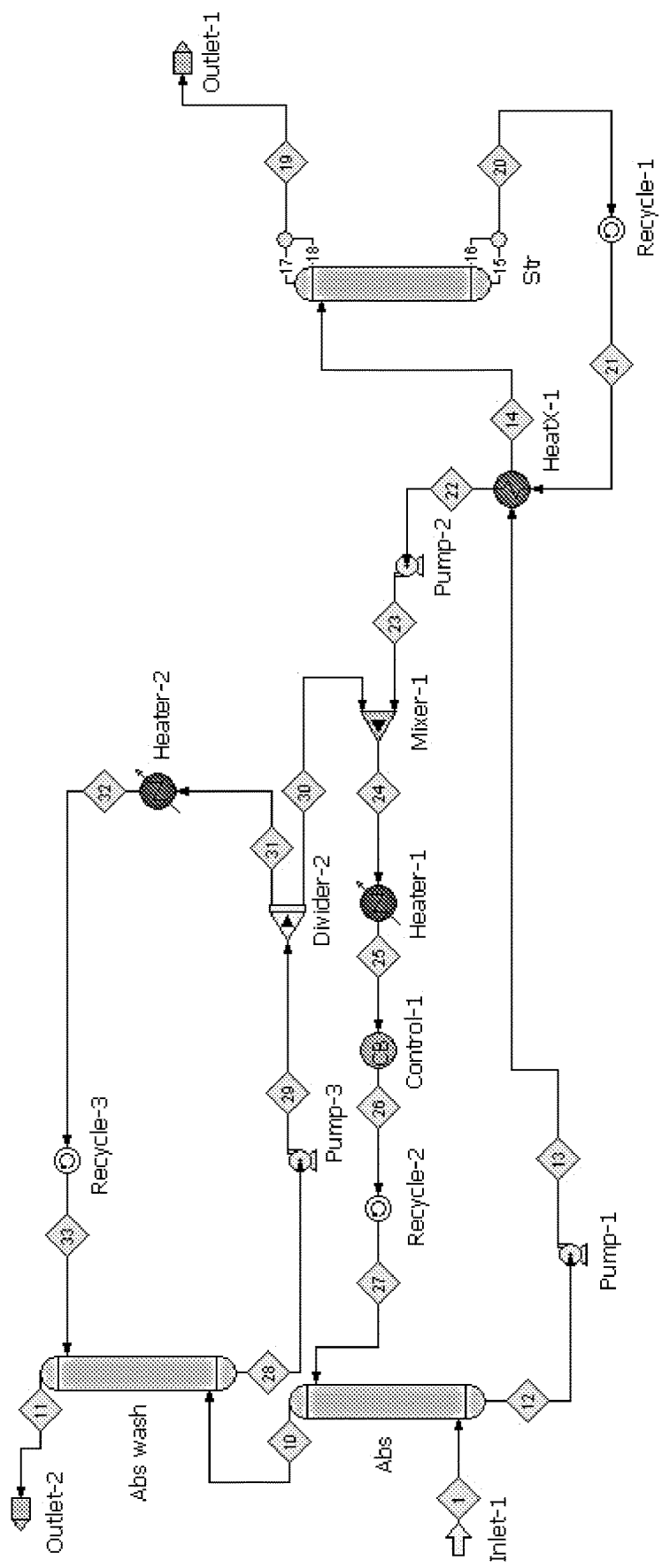
FIG. 4 is a schematic diagram of a conventional $CO_2$ capture process.
Figure 5:
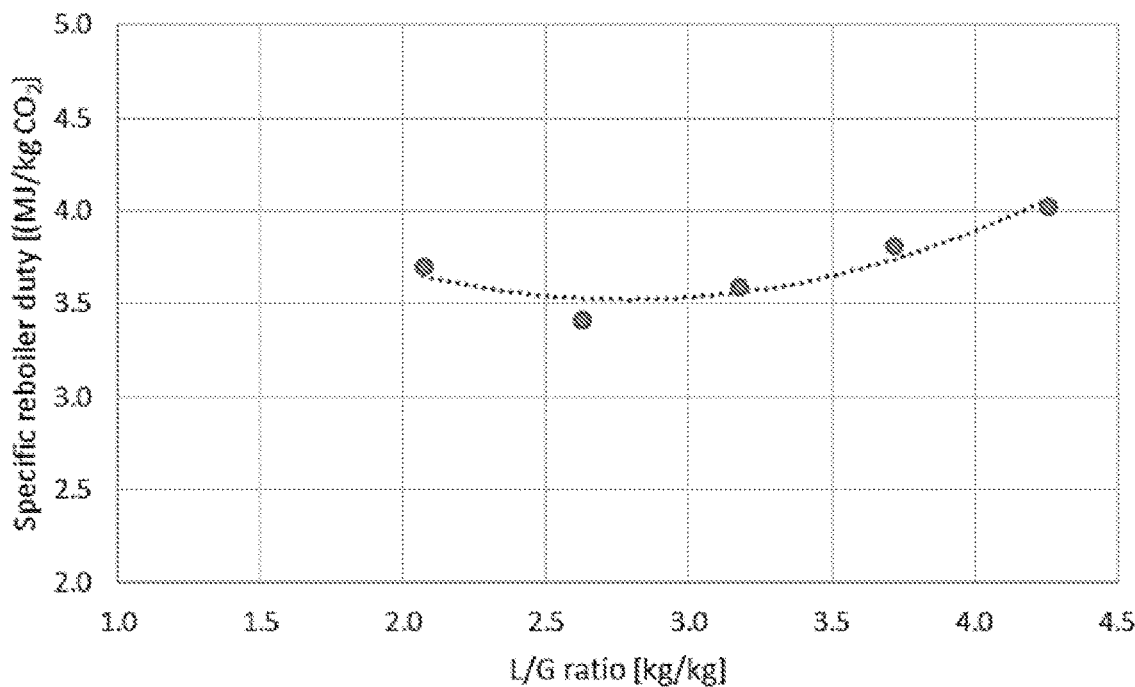
FIG. 5 is a graph of specific reboiler duty versus absorbent liquid/flue gas (L/G) ratio of the process in FIG. 4.

A model of the standard absorption/desorption process using a 5M MEA solution was run to determine the base case scenario (FIG. 4). The flue gas enters the absorber (Abs) via Inlet-1 and leaves the system as Outlet-2. A wash section (Abs wash) was employed after the absorber, with excess water recycled back to the lean absorbent. The temperature of the wash water was adjusted (Heater-2) until water balance was achieved for the plant (i.e. water in incoming flue gas matched that in the exiting gas streams to within ±1 kg/h). A condenser was employed on the stripping column gas exit. This was set to 40° C. with 100% of the condensate recycled back to the stripping column. The $CO_2$-product leaves the process as Outlet-2 from the stripper (STR). The amount of $CO_2$ captured is 96.8 kg/h which represents 90% removal from the incoming flue gas. The absorption liquid/flue gas ratios (L/G expressed as mass flow rates for the absorption liquid, L, and flue gas, G) varied in the base case scenario to determine the point where the reboiler duty was at its minimum. The results shown in FIG. 5 indicate that a minimum reboiler duty of 3.4 MJ/kg $CO_2$ is obtained for an L/G around 2.6-2.7. At this point the reflux ratio in the stripper is around 0.41 kg $H_2O$/kg $CO_2$.

Example 2

Figure 6:
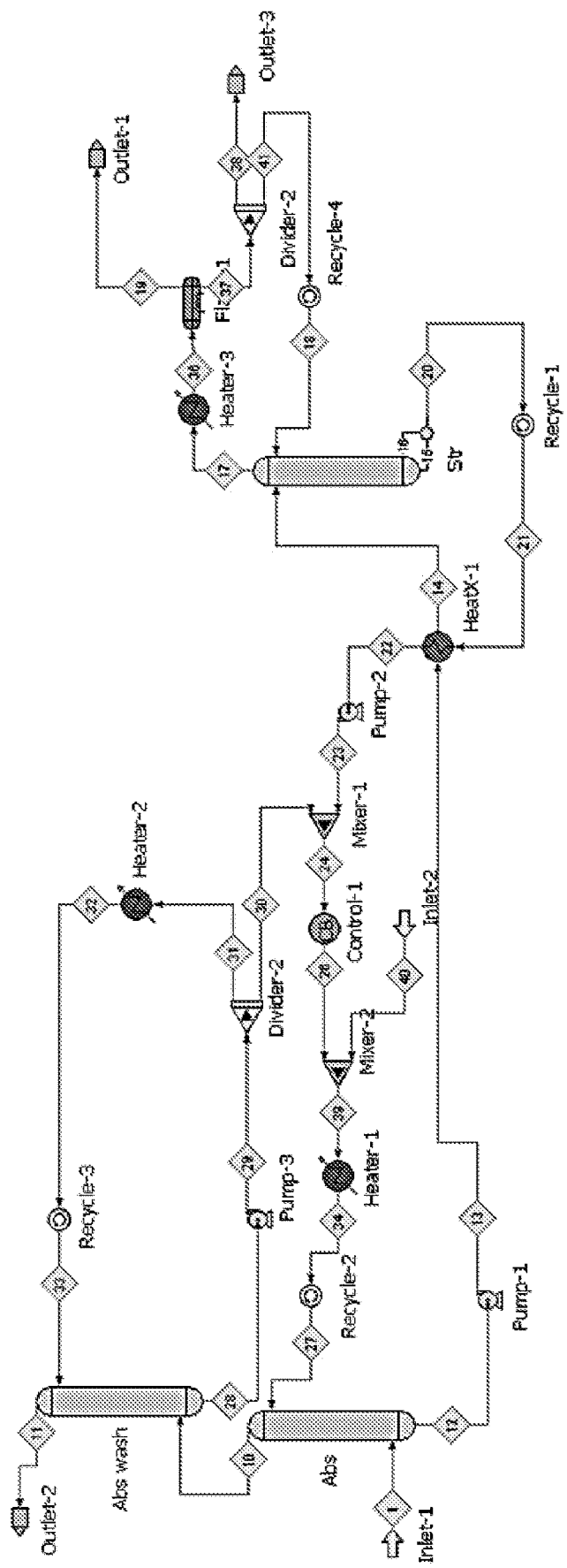
FIG. 6 is a schematic diagram of a modified process with water recovery in the stripper.

A modified process flow sheet is shown in FIG. 6. Water was added to the process upstream of the lean solvent trim cooler, through line 40, representing the effect of the Forward Osmosis unit. The process simulator ProTreat™ will add/remove water or amine at this point to ensure mass balance for the plant. The condenser was removed from the stripping column gas exit. Instead, a cooler (set to 40° C.) and a separator were used. The condensate leaving the separator was split, with water matching the amount added before the trim cooler removed via line 38, and the remainder being recycled to the stripping column.

Figure 7:
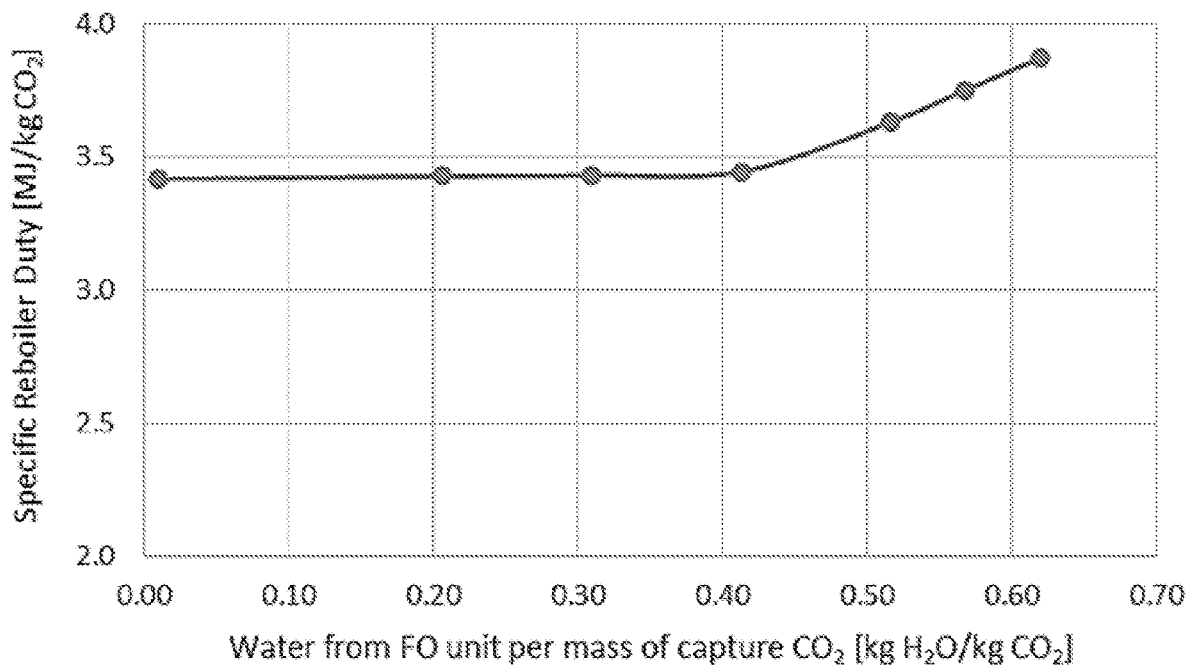
FIG. 7 is a graph of specific reboiler duty versus water from FO unit per mass of captured $CO_2$ of the process in FIG. 6.

The performance of the $CO_2$-capture process was modelled for a number of different water additions at the optimum L/G ratio of 2.6-2.7 kg/kg at the same levels of $CO_2$ capture (90%). In FIG. 7 the specific reboiler duty is shown at different levels of water addition by the FO unit.

It was found that addition of water did not significantly affect the specific reboiler duty, which was at the same minimum value of 3.4 MJ/kg $CO_2$ up to a water/addition of 0.41 kg $H_2O$/kg $CO_2$. However, as the amount of the water addition/removal increased, the reflux flow from the stripping column condenser decreased to zero. If more water was then added to the liquid absorbent its removal in the stripper resulted in a higher reboiler duty, which is not desired. The maximum water recovery without incurring additional energy consumption is at the point where the reflux flow approaches zero. The increase in absorption liquid flow rate is around 2.5%, which is small enough not to require major changes in the capacities of heat exchange equipment used. This flow rate increase will have a negligible impact on the absorber and stripper column sizes.

An important parameter is the quality of the water recovered in the stripper. At the maximum water recovery the process modelling indicates that the levels of MEA are negligible (<<1 ppm), with dissolved $CO_2$ being the main impurity (1750 ppm). Under realistic process conditions the water might contain volatile degradation products such as ammonia and products that are carried over as droplets.

Example 3

Water taken up by the liquid absorbent through the FO unit can also be recovered in the absorber through an intercooling process. This route takes advantage of the exothermic character of the $CO_2$-absorption process. This results in a temperature increase of the absorption liquid, which might limit the absorption of $CO_2$ as the mass transfer driving force decreases with temperature. Depending on the type of absorption liquid the capture process might involve absorber intercooling in which the absorption liquid is withdrawn from the absorber, cooled down in a heat exchanger and pumped back into the absorber. Similarly the absorption liquid might be withdrawn from the absorber and allowed to cool via evaporation of water under conditions of partial vacuum, followed by recovery of the water condensate in condensing heat exchanger.

Figure 8:
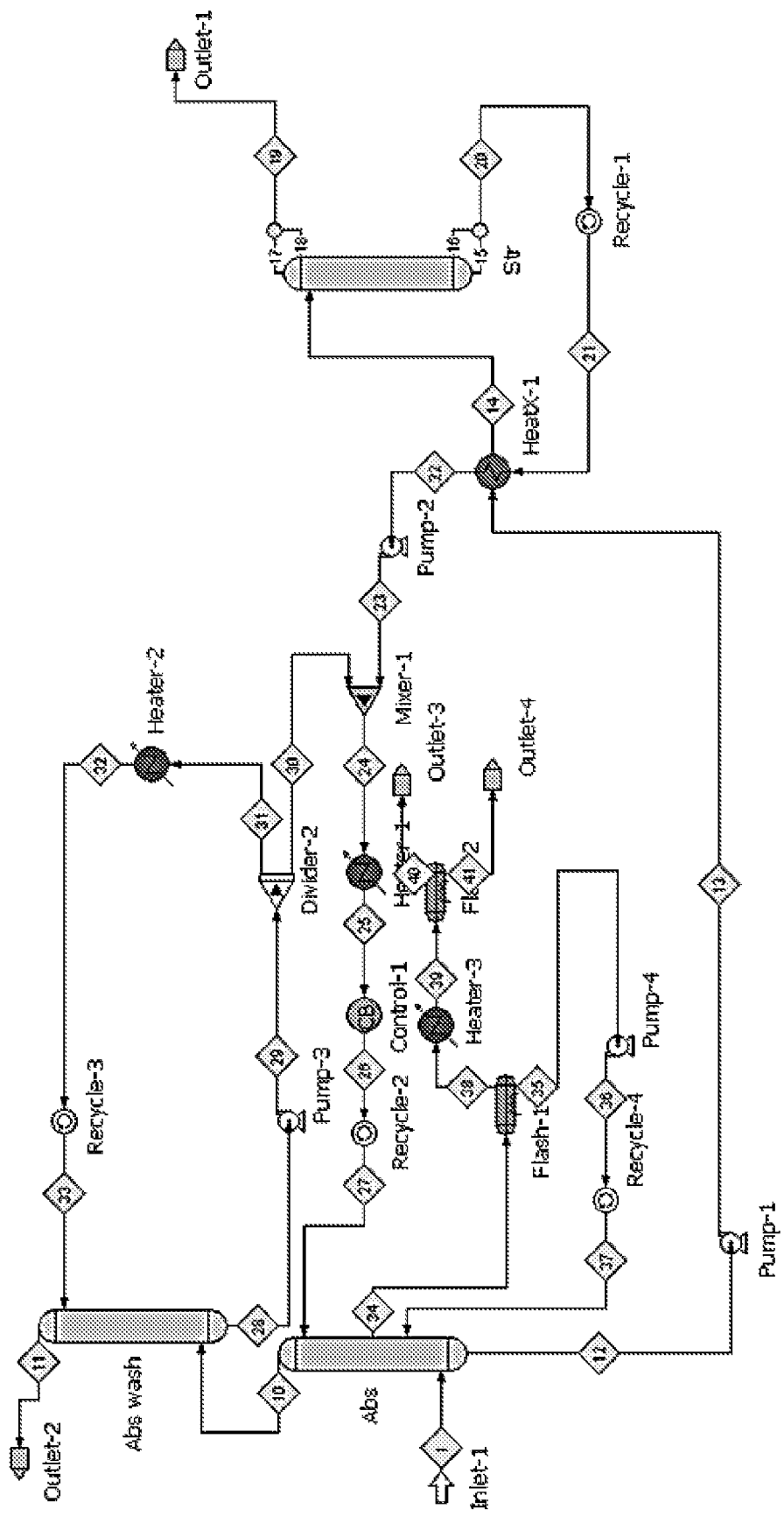
FIG. 8 is a schematic diagram of a modified process with water recovery in the absorber.

FIG. 8 show the process flow sheet for the combined $CO_2$-capture—desalination process with water recovery in the absorber. Absorption liquid is withdrawn from the absorber through stream 34 and sent to a flash vessel (Flash-1) which operates at a set pressure, lower than vapour pressure of the absorption liquid causing water to evaporate. The water vapour is condensed (Heater-3) with the condensate removed in the gas/liquid separator through Outlet-4 and residual gases through Outlet-3. The amount of condensate will be dependent on the temperature of the absorption liquid, which is determined by the position and the pressure set-point in the flash.

Process simulations focused on the base case described in example where a temperature bulge to 75° C. was noted in the absorber column at 1.1 m from the top of the 7.2 m column. In the modified plant the absorption liquid was withdrawn at this point and pumped to the flash vessel where water was allowed to evaporate at a given pressure level.

Figure 9:
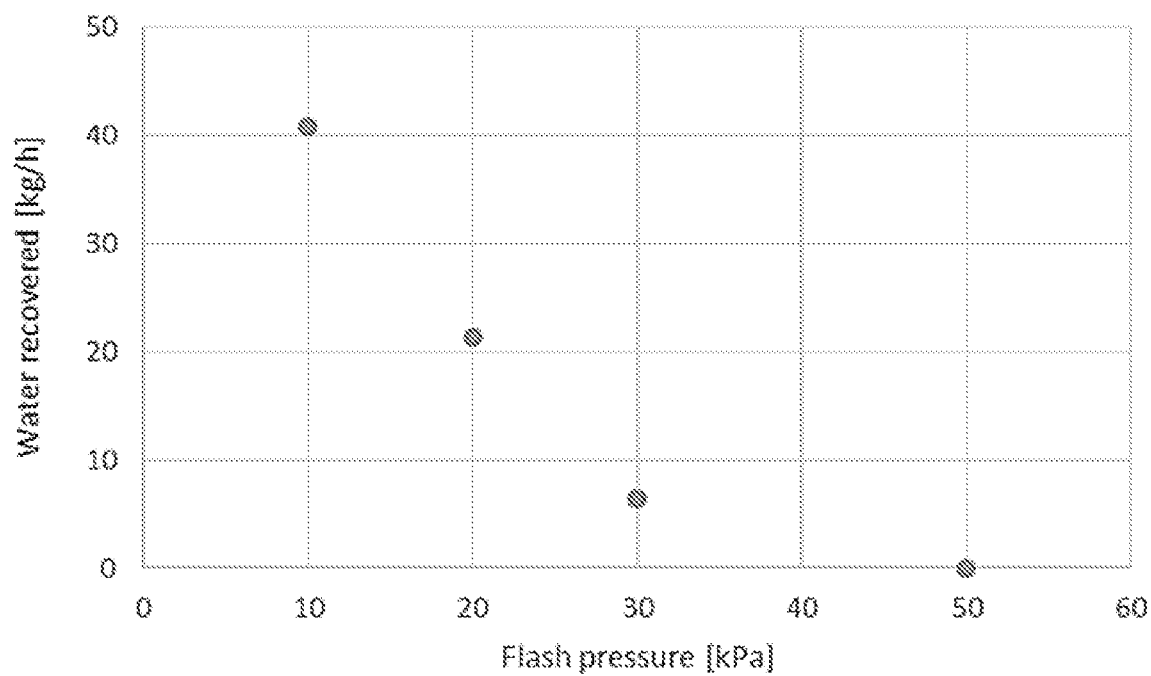
FIG. 9 is a graph of water recovered versus flash pressure vessel of the process in FIG. 8 using a 5M monoethanolamine (MEA) absorbent.

FIG. 9 gives the amount of water recovered as determined for different pressure levels in the flash vessel. The amount of water recovered increased with decreasing pressure in the flash vessel. The water recovery at the lowest pressure level of 10 kPa is equivalent to 0.41 kg $H_2O$/kg $CO_2$ produced, i.e. quite similar to the levels of recovery determined in the stripper (example 2).

The water recovered has as major impurities MEA (7700 ppm) and $CO_2$ (6600 ppm). Depending on the intended use of the water, additional treatment may be necessary to remove these impurities.

Example 4

The base process flow sheet presented in FIG. 1 was utilised to determine the process performance with a 6M aqueous sodium-glycinate (Na-Gly) solution as the absorption liquid for $CO_2$. An optimum reboiler duty of 3.4 MJ/kg $CO_2$ was determined for L/G equal to 2.5, which was quite similar to 5M MEA solution. Next the modified process flow sheet with water recovery in the stripper presented in FIG. 3 was utilised and the impact of water/addition on the reboiler duty was assessed up to the point where the reflux ratio in the stripper approached zero at the optimum L/G ratio of 2.5. For the Na-Gly solution the maximum amount of water that can be recovered without increasing the reboiler duty is equivalent to 0.31 kg $H_2O$/kg $CO_2$.

Example 5

Figure 10:
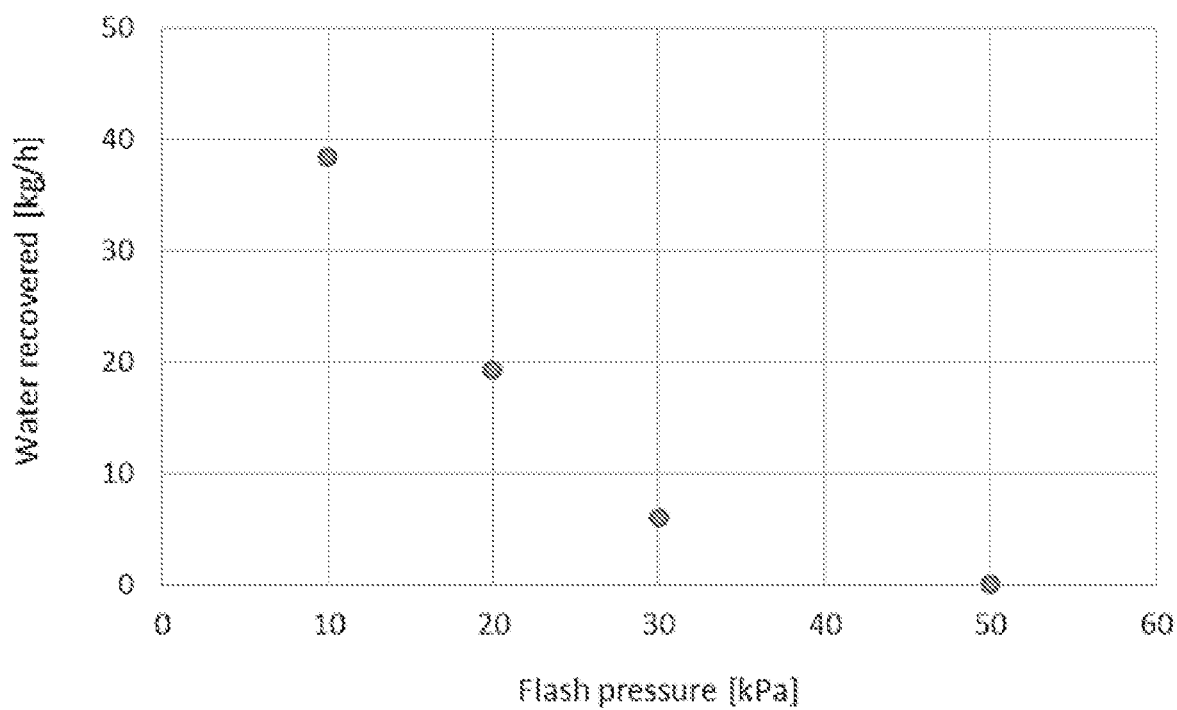
FIG. 10 is a graph of water recovered versus flash pressure vessel of the process in FIG. 8 using a 6M sodium-glycinate absorbent.

The modified process flow sheet with water recovery in the absorber presented in FIG. 10 was utilised to determine the performance with a 6M aqueous sodium-glycinate (Na-Gly) solution as the absorption liquid for $CO_2$. FIG. 7 gives the amount of water recovered as determined for different pressure levels in the flash vessel. The amount of water recovered increased with decreasing pressure in the flash vessel. The water recovery at the lowest pressure level of 10 kPa is equivalent to 0.40 kg $H_2O$/kg $CO_2$ produced. The product did not contain any Na-Gly and contained gaseous $CO_2$ as the main impurity (1470 ppm). This illustrates the advantage of utilising amino-acid salt solutions as capture agents.

Example 6

The membrane area needed to transfer water from the brine coolant is a determinant for the cost and the performance of the Forward Osmosis unit as a heat exchanger. Commercially available forward osmosis membranes have a water permeability in the range of $0.5$-$1.5 10^{-3}$ kg/($m^2$sMPa). In case the brine is seawater with an osmotic pressure equal to 3 MPa at 40° C. the osmotic pressure difference with the absorption liquid solutions are estimated to be 10 MPa for 5M MEA and 30 MPa for 6M sodium-glycinate (using equation 1). For previous examples the water production of 0.4 kg $H_2O$/kg$CO_2$ is equivalent to $10^{-2}$ kg/s water produced. Table 2 provides estimates for the membrane area requirement for the two chosen absorption liquids. The membrane area requirement varies between 0.2 and 2 $m^2$ dependent on the absorption liquid and water permeability.

TABLE 2

Membrane area requirement for Forward Osmosis process in $CO_2$-capture

| Draw solution | Water permeability | |
|---|---|---|
| | $0.5 \cdot 10^{-3}$ kg/($m^2$sMPa) | $1.5 \cdot 10^{-3}$ kg/($m^2$sMPa) |
| 5M MEA | 2 $m^2$ | 0.7 $m^2$ |
| 6M Sodium Glycinate | 0.7 $m^2$ | 0.2 $m^2$ |

The heat transfer performance of the Forward Osmosis membranes is not known a priori. As the membranes are thin by their requirement to have high permeation rates it is anticipated that the heat transfer coefficient will be much higher than that for commercially available heat exchangers using polymeric materials (~200 W/$m^2$K). A value of 2000 W/$m^2$K is feasible, assuming a ten-fold thinner polymeric layer compared to a standard polymeric heat exchanger. The result from the Protreat process modelling indicate that the lean absorption liquid needs to be cooled down from 64° C. to 40° C. before entry into the absorber. If this is done with seawater at 25° C. with 20 K temperature rise, the heat exchanger area requirement is determined to be 1 $m^2$. The comparison with the results for the membrane area requirement in table 1 indicate that there is a good match between the membrane area requirement and the heat transfer area requirement. Therefore it is feasible to replace the trim cooler in the $CO_2$ capture process by a Forward Osmosis unit with the dual function of water recovery and absorption liquid cooling.

Example 7

Osmotic pressures of aqueous solutions using the $CO_2$ absorbents mono-ethanolamine, glycine and sodium glycinate were determined experimentally. Sodium glycinate was prepared using equimolar amounts of glycine and sodium hydroxide in an aqueous solution. A Forward Osmosis membrane with an area of 0.014 $m^2$ from Porifera, Inc, USA was used. The membrane has a pure water flux of 28.8±10 L/$m^2$h and reverse solute flux of 0.4 g/L (pure water Vs 1M NaCl at 25° C.) and a maximum operating temperature of 80° C.

Figure 11:
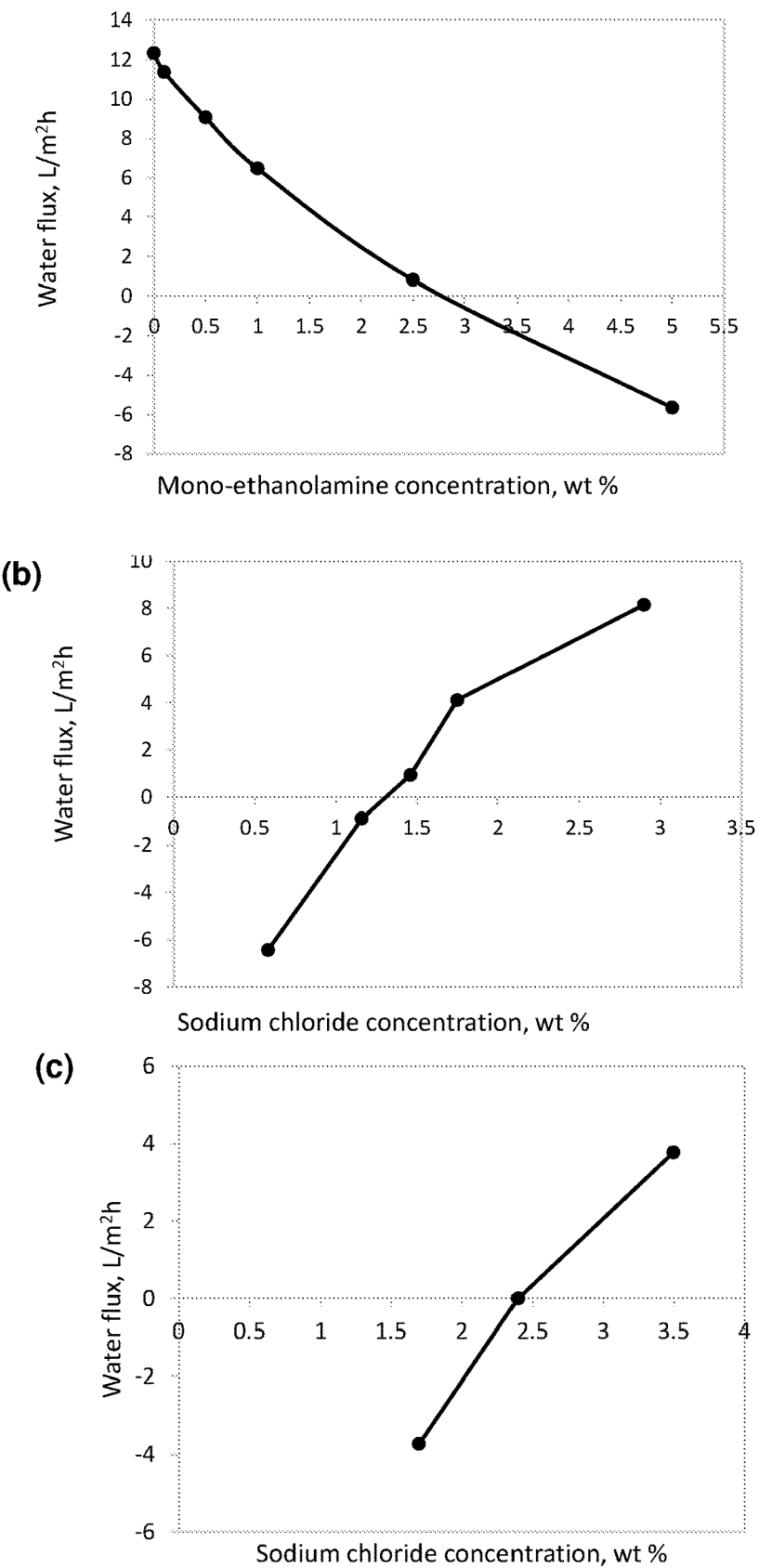
FIG. 11 provides three graphs of water flux with different feed and draw concentrations showing (a) mono-ethanolamine Vs 1.17 wt % NaCl at 25° C., (b) NaCl Vs 3 wt % glycine at 25° C., (b) NaCl Vs 3 wt % sodium glycinate at 25° C.

The absorbent solution with unknown osmotic pressure was introduced on one side of the Forward Osmosis membrane and sodium chloride with known osmotic pressure as the draw solution on the other side of the membrane. The concentration of the sodium chloride was gradually reduced while the concentration of the absorption solution was kept constant or vice versa. Eventually the system reached an equilibrium and at this point the osmotic pressure of the absorption solution equals the osmotic pressure of the sodium chloride solution resulting in no water transfer across the membrane. Thus the osmotic pressures of the two absorption liquids were determined. FIG. 11 shows the water fluxes with the three absorption solutions attaining the equilibrium point concentration with sodium chloride in order to determine their osmotic pressures. The negative water flux indicates the reversal of water permeation direction between feed and draw solutions due to the change in osmotic pressure difference between of the solutions.

Table 3 gives the experimentally determined osmotic pressures of mono-ethanolamine, glycine and sodium glycinate absorption solutions. Osmotic pressure of sodium chloride is also provided as a reference. The osmotic pressure of sodium glycinate amino acid absorption solution was higher than mono-ethanolamine. The osmotic pressure of glycine was lower than the other two absorption liquids.

TABLE 3

Osmotic pressure of absorption liquids (3 wt % at 25° C.)

| Test solution | Osmotic pressure, atm |
|---|---|
| Mono-ethanolamine | 13.2 |
| Glycine | 11.1 |
| Sodium glycinate | 21.7 |
| Sodium chloride | 26.5 |

Example 8

The absorption liquids from Example 7 were tested for water flux permeation using the Porifera membranes with representative sea water using a 0.59 M NaCl solution (Table 4). It was found that at typical concentrations of absorption liquids used in the $CO_2$ capture process, water was able to be transferred from the sea water solution to the absorption liquids. The experimental results indicate that the proposed concept of water production and sea water desalination with absorption liquids is possible with the use of forward osmosis in the $CO_2$ capture system. As the osmotic pressure of sodium glycinate amino acid solution is higher than mono-ethanolamine and glycine, its water flux was found to be the highest.

TABLE 4

Sea water desalination using three absorption liquids in forward osmosis (0.59M NaCl as seawater, 25° C.)

| Absorption liquid | Average water flux, $L/m^2h$ |
|---|---|
| 5M Mono-ethanolamine | 16.83 |
| 6M Glycine | 12.44 |
| 6M Sodium glycinate | 35.1 |

Example 9

Figure 12:
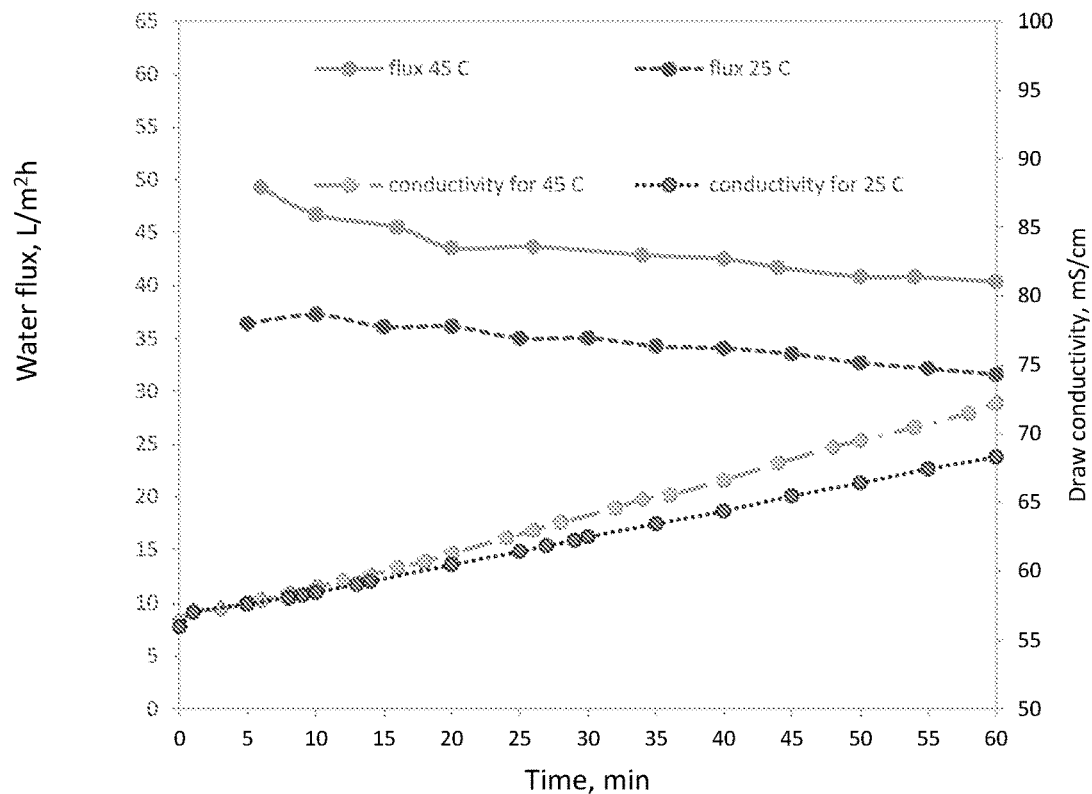
FIG. 12 is a graph illustrating the effect of temperature of absorption solution on water flux (0.59 M NaCl sea water draw solution at 25° C., starting concentration of sodium glycinate absorption liquid feed solution 6M).

In order to study the effect of absorption liquid temperature on water flux, a sodium glycinate solution was evaluated at elevated temperature (45° C.±2° C.) while keeping the sea water at ambient temperature. FIG. 12 shows that the water flux increased with the increase in absorption liquid temperature. This means that more water can be produced (enhancement in sea water desalination) at higher absorbent temperature. The sea water is being concentrated due to the selective transfer water across the membrane from sea water to the absorption solution. The concentration profile of sea water is also shown in FIG. 12 for the two different absorption liquid temperatures under the operating conditions adopted in this study.

Example 10

Figure 13:
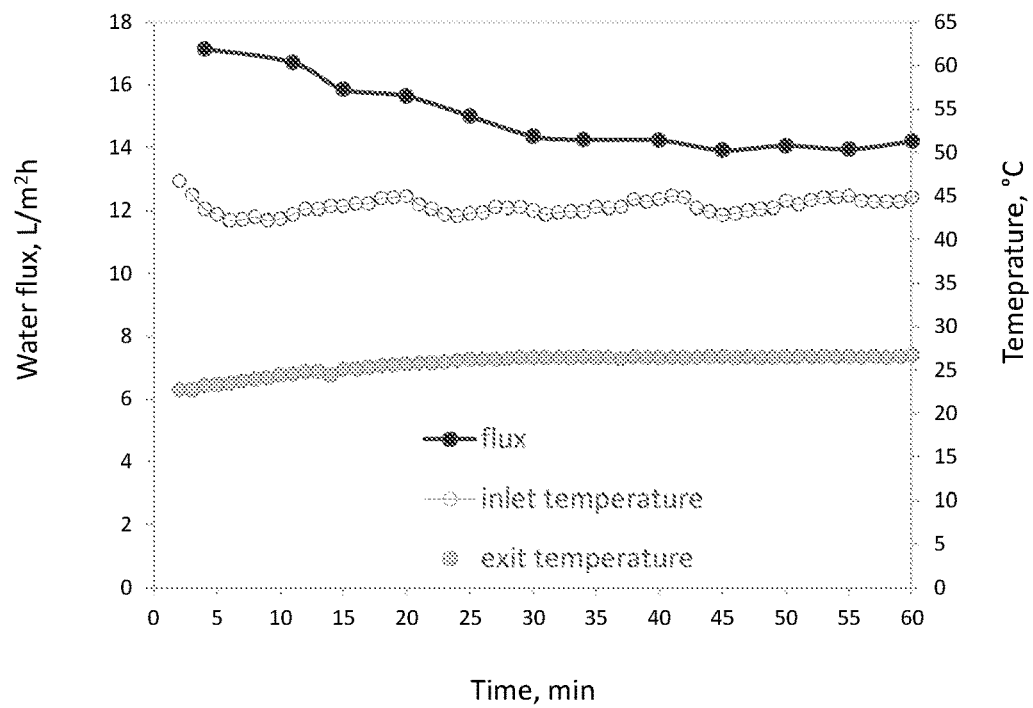
FIG. 13 is a graph of water flux and temperature profile at elevated mono-ethanol amine temperature (5M mono-ethanolamine absorption feed solution).

A 5M mono-ethanolamine aqueous solution was also evaluated at elevated temperature (45° C.±2° C.), with a sodium chloride draw solution at ambient temperature. The starting concentration for the sodium chloride solution was about twice the concentration of sea water and reflects a typical brine concentration produced by a desalination process. The flux and the temperature patterns of the mono-ethanol amine through the FO is shown in FIG. 13. More than 15% improvement in water flux was achieved with mono-ethanolamine operation at inlet temperature of 45° C., compared to at 25° C. As the absorption liquid flows through the Forward Osmosis membrane, with draw solution on the other side, the absorption liquid is being cooled and the exit (return from FO) temperature was found to be about 26.5° C. (FIG. 13). This supports the concept of replacing the trim cooler in $CO_2$ capture system with FO, with additional benefit of water desalination.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

Supporting Calculations for Example 6

| Inputs | | |
|---|---|---|
| Fluid$_1$ mass flow rate, $m_1$ = | 1,560 | kg/hr |
| Fluid$_1$ temp. in, $T_{1in}$ = | 64 | ° C. |
| Fluid$_1$ temp. out, $T_{1out}$ = | 40 | ° C. |
| Fluid$_1$ sp. heat, $C_{p1}$ = | 3.4 | kJ/kg-° C. |
| Fluid$_2$ temp. in, $T_{2in}$ = | 25 | ° C. |
| Fluid$_2$ temp. out, $T_{2out}$ = | 45 | ° C. |
| Fluid$_2$ sp. heat, $C_{p2}$ = | 4.2 | kJ/kg-° C. |
| Overall heat transf. coeff. estim., U = | 2000 | J/sec-$m^2$-K |
| Calculations | | |
| Overall heat transf. coeff. estim., U = | 7200 | kJ/hr-$m^2$-K |
| Heat Transfer Rate, Q = | 127,296 | kJ/hr |
| Log Mean Temp Diff, $\Delta T_{lm}$ = | 16.9 | ° C. |
| Heat Transfer Area, A = | 1.04 | $m^2$ |
| Fluid$_2$ mass flow rate, $m_2$ = | 1515 | kg/hr |

Equations used for calculations:

$Q = \pm (m_1)(C_{p1})(T_{1in} - T_{1out})$
$Q = \pm (m_2)(C_{p2})(T_{2in} - T_{2out})$
$\Delta T_{lm} = [(T_{1in} - T_{2out}) - (T_{1out} - T_{2in})]/\ln[(T_{1in} - T_{2out})/(T_{1out} - T_{2in})]$
$Q = U A \Delta T_{lm}$

The invention claimed is:

1. A process for the absorption of a target gaseous component from a gas stream comprising the steps of:
    contacting the gas stream with an absorber comprising a liquid absorbent for absorbing the target gaseous component to produce a rich liquid absorbent stream and a non target gaseous component, said non target gaseous component including water vapour;
    treating the rich liquid absorbent stream in a desorber to thereby release the target gaseous component and a water vapour component into a desorber gas stream and produce a lean liquid absorbent stream; and
    forming a recovered water stream from the output of a water separator for separating the water vapour from the target gaseous component, said water separator forming part of the absorber and/or the desorber,
    wherein the lean liquid absorbent stream exiting the desorber is treated with a forward osmosis (FO) membrane unit comprising a water permeable membrane, and wherein the membrane unit transfers water from a salt water stream through the water permeable membrane to the lean liquid absorbent stream, thereby replenishing at least part of the water removed in the process.

2. The process according to claim 1, wherein the FO membrane unit replenishes all of the water removed in the process.

3. The process according to claim 1, wherein the water separator forms part of the absorber and the desorber.

4. The process according to claim 3, wherein the water separator comprises a condenser.

5. The process according to claim 2, wherein the process further comprises passing a portion of an absorber liquid through a flash vessel to produce a flash vapour stream and passing said flash vapour stream through a water separator to separate the water component from the flash vapour stream to form at least part of the recovered water stream.

6. The process according to claim 5, wherein the flash vessel comprises a water vapour permeable vacuum membrane evaporator.

7. The process according to claim 1, wherein the salt water inlet stream is cooler, preferably at least 10° C. cooler, than the lean liquid absorbent solvent stream entering the FO membrane unit.

8. The process according to claim 1, wherein the lean liquid absorbent stream is pre-treated in a direct contact membrane distillation unit prior to the forward osmosis membrane unit.

9. The process according to claim 1, wherein the liquid absorbent has a vapour pressure at 100° C. of less than 40 mm Hg.

10. The process according to claim 1, wherein the liquid absorbent comprises an amino acid salt.

11. The process according to claim 1, wherein the salt water is sea water, brackish water or industrial waste water.

12. The process according to claim 1, wherein the recovered water stream has a total dissolved salt content of less than 10,000 ppm.

13. The process according to claim 1, wherein the recovered water stream is potable water.

14. The process according to claim 1, wherein the recovered water stream, exiting the water separator, has an absorbent content of less than 500 ppm.

15. The process according to claim 1, wherein the membrane unit comprises a membrane made of cellulose acetate, cellulose nitrate, polysulfone, polybenzimidazole, polyvinylidene fluorine; polyamide and acrylonitrile copolymers; and ceramic materials, such as zirconia and titania.

16. The process according to claim 1, wherein the lean liquid absorbent stream passes through a direct contact membrane distillation (DCMD) unit, said DCMD unit comprising a membrane having a feed membrane interface and a permeate membrane interface, prior to passing through the forward osmosis unit, the DCMD unit resulting in a portion of the water in the lean liquid absorbent stream to vaporise on the feed membrane interface and condense on the permeate membrane interface, thereby cooling the lean liquid absorbent stream and transferring water to the inlet salt water stream.

17. An apparatus for the recovery of acidic gases from a gaseous stream and the recovery of a water stream comprising:
an absorber for contacting a liquid absorbent with a gas stream, said absorbent capturing a target gaseous component to produce a rich liquid absorbent stream, and a non target gaseous component, said non target gaseous component including water vapour;
a desorber to heat treat the rich liquid absorbent stream to thereby release the target gaseous component from the rich liquid absorbent stream to produce a lean liquid absorbent stream and water vapour;
a water separator for separating water vapour from a target gaseous component to form a recovered water stream, said water separator forming part of the absorber and/or the desorber;
a forward osmosis membrane unit positioned to receive the lean liquid absorbent stream; and
an absorber inlet stream for receiving the lean liquid absorbent stream from the forward osmosis membrane unit,
wherein the forward osmosis membrane unit comprises an inlet salt water stream and an outlet salt water stream, said forward osmosis membrane unit comprising a water permeable membrane to enable water to migrate form the salt water stream to the lean liquid absorbent stream.

18. The apparatus according to claim 17, further comprising a direct contact membrane distillation (DCMD) unit, said DCMD unit comprising a membrane having a feed membrane interface and a permeate membrane interface, positioned between the desorber and the forward osmosis membrane unit, the DCMD unit resulting in a portion of the water in the lean liquid absorbent stream to vaporise on the feed membrane interface and condense on the permeate membrane interface, thereby cooling the lean liquid absorbent stream and transferring water to the inlet salt water stream.

19. The apparatus according to claim 17, wherein the absorber further comprises a flash vessel to produce a flash vapour stream and a water separator to condense a water component from the flash vapour; said water separator comprising a recovered water stream for collecting the condensed water vapour component.

20. The apparatus according to claim 19, wherein the flash vessel comprises a water vapour permeable vacuum membrane evaporator.

* * * * *